Dec. 19, 1967  A. MUSSCHOOT ETAL  3,358,815
VIBRATORY APPARATUS
Filed Jan. 9, 1967  3 Sheets-Sheet 1
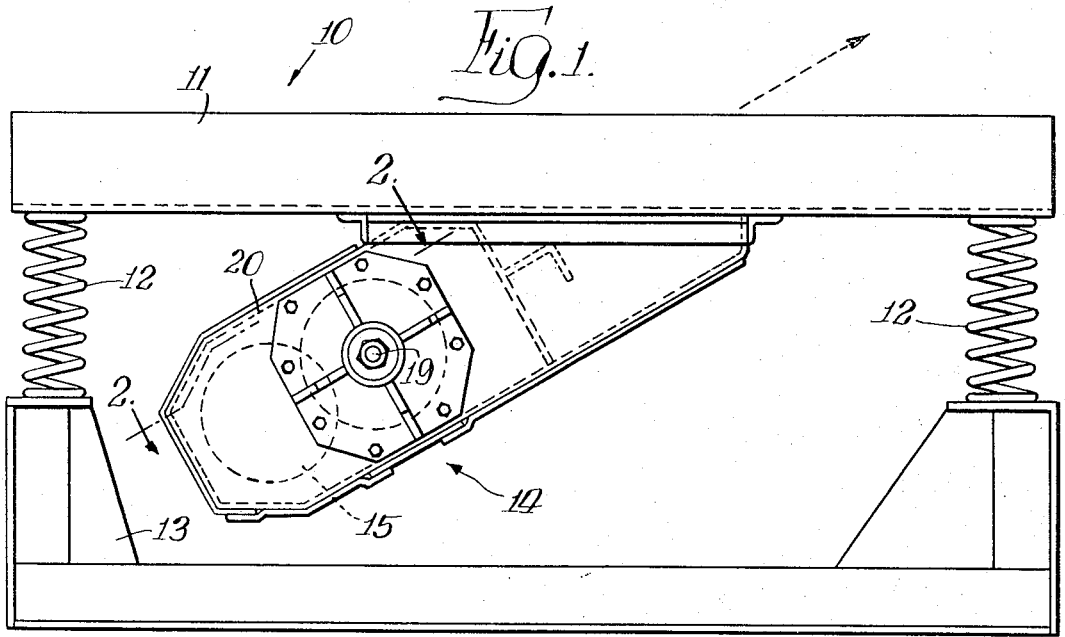
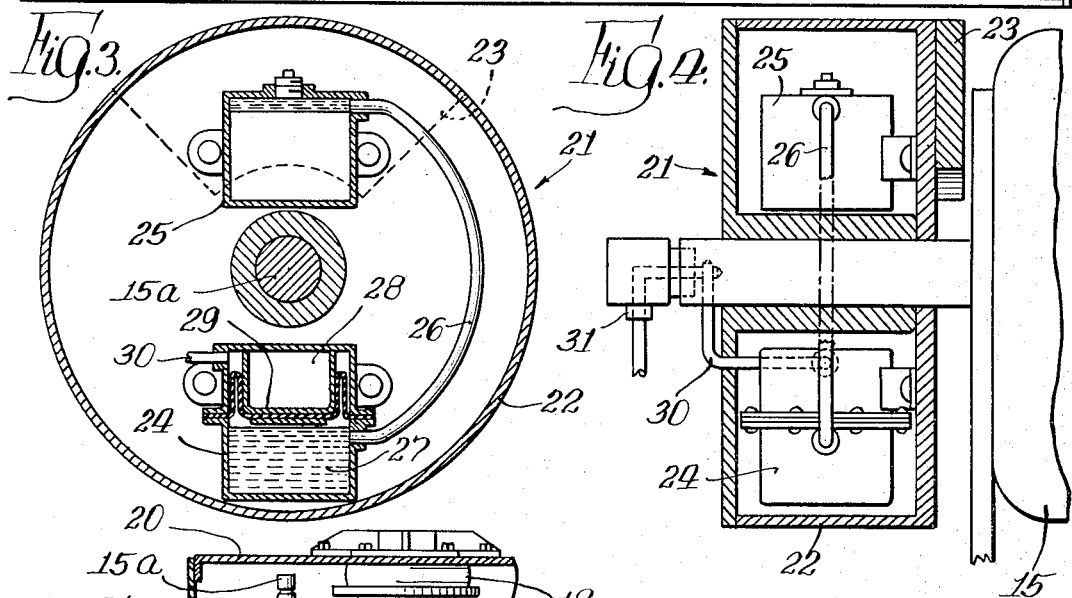
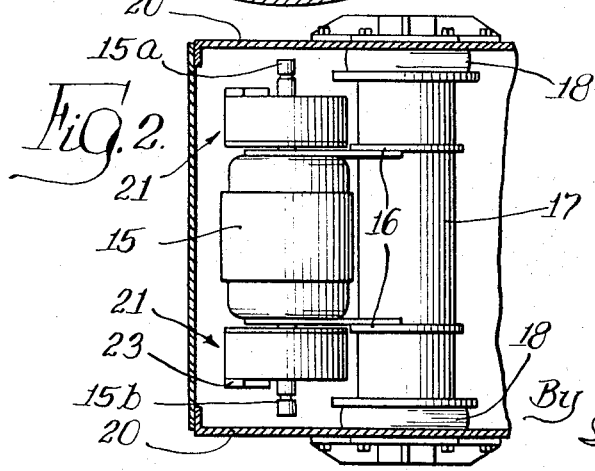
Inventors:-
Albert Musschoot,
Marvin G. Thomson
By Hofgren, Wegner, Allen,
Stellman & McCord Attys.

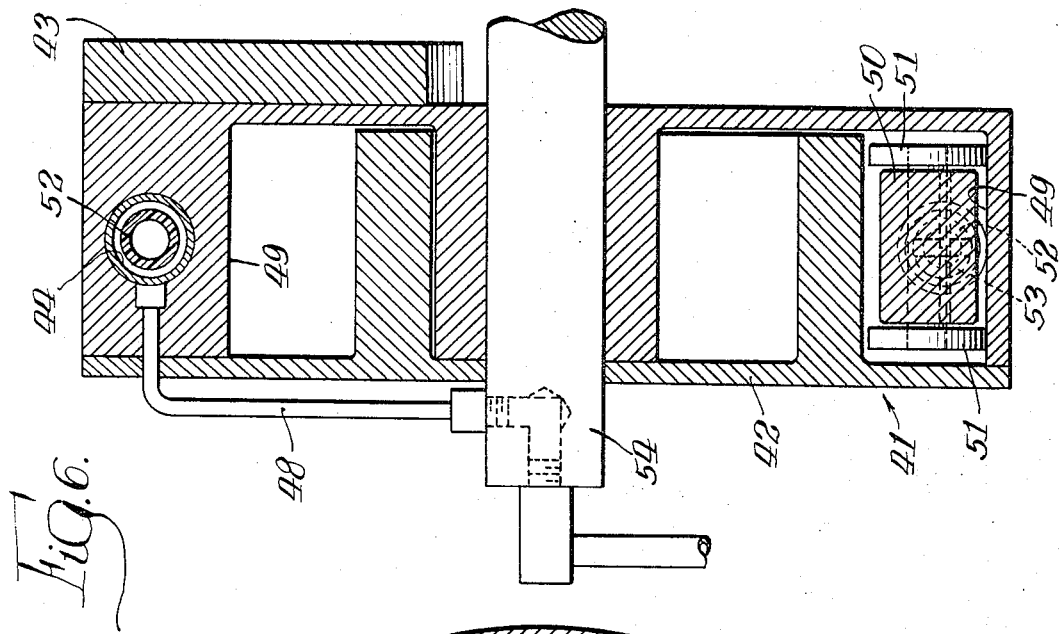
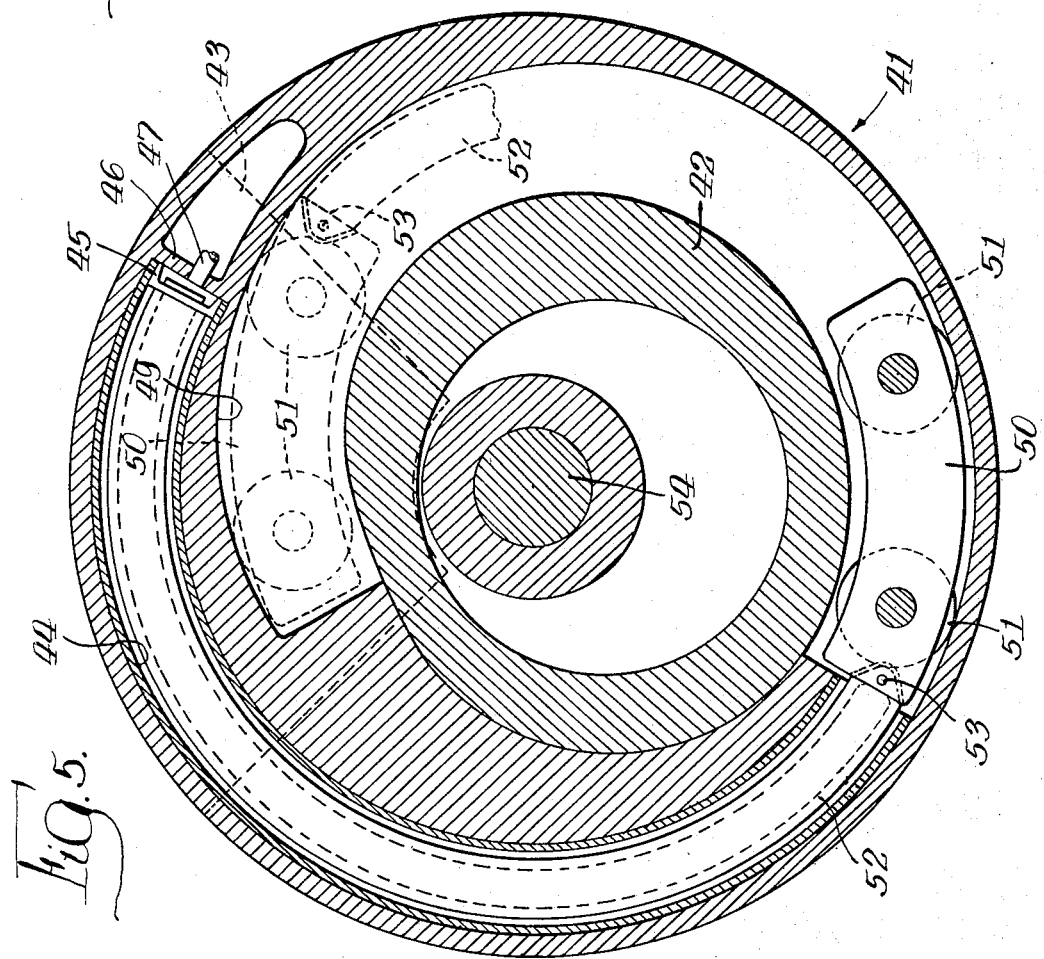

United States Patent Office 3,358,815
Patented Dec. 19, 1967

3,358,815
VIBRATORY APPARATUS
Albert Musschoot, Barrington, and Marvin G. Thomson, Prospect Heights, Ill., assignors to General Kinematics Corporation, a corporation of Illinois
Filed Jan. 9, 1967, Ser. No. 617,744
16 Claims. (Cl. 198—220)

ABSTRACT OF THE DISCLOSURE

This invention provides a means of changing the amplitude of vibration of a vibratory feeder or conveyor by modifying the distribution of the mass and effective eccentricity of counterweights on a rotary counterweight wheel. In addition, the arrangement may be such whereby such distribution and effective eccentricity is varied by an external force, for example, air pressure, whereby increase in pressure will either increase or decrease the eccentricity thereby permitting a combination of material feeders which may operate as a proportioning system.

---

This application in a continuation-in-part of our co-pending Ser. No. 477,190, filed Aug. 4, 1965.

This invention relates to vibratory apparatus and more particularly to a rotatable counterweight means having a selectively variable eccentricity particularly adapted for use in combination with a vibratory apparatus for producing work by vibration.

It is the general object of the present invention to produce a new and improved vibratory apparatus and counterweight members of the character described.

It is a more specific object of the invention to produce a counterweight member particularly useful in vibratory apparatus wherein the member carries an eccentric weight, the eccentricity of which is variable whereby the magnitude of vibrations created by rotation of the counterweight member can be varied during operation thereof.

Vibratory apparatus have proved useful in many fields, particularly in the field of feeding and conveying particulate material. The Musschoot et al. patent 3,089,582 shows a vibratory feeder of the general class to which the present invention is applicable. Such apparatus normally includes a trough or work member supported on isolation springs and carrying an exciter member in the form of an electric motor having eccentric weights mounted on the shaft thereof so that rotation of the motor produces vibrations. A spring system interconnects the exciter member and the work member or trough so that the latter is vibrated as the motor is operated. It has been common practice to utilize in the interconnecting spring system both a fixed rate and a variable rate spring together with a constant speed motor whereby the effective spring rate of the interconnecting spring system can be varied during operation thus to vary the amplitude of movement of the trough. Such systems, while widely used, are not completely feasible under all conditions nor is the degree of control attainable thereby as precise or exact as may be desired.

Accordingly, it is another object of the present invention to produce a vibratory feeder or conveyor wherein means are provided for precisely and accurately varying the amplitude of movement of the work member thereby to control the rate of feed of material in the work member. This is accomplished, simply stated, by providing a counterweight member driven by the motor which has an eccentric weight thereon, the eccentricity of which can be varied during operation. As the motor operates at a substantially constant speed, the degree of eccentricity directly affects the vibratory force exerted by the exciter member and hence the amplitude of the vibrations of the work member.

Figure 7:
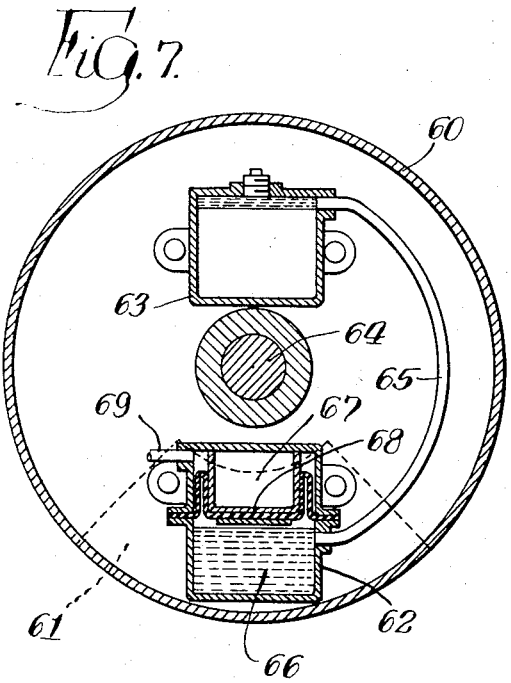
Figure 8:
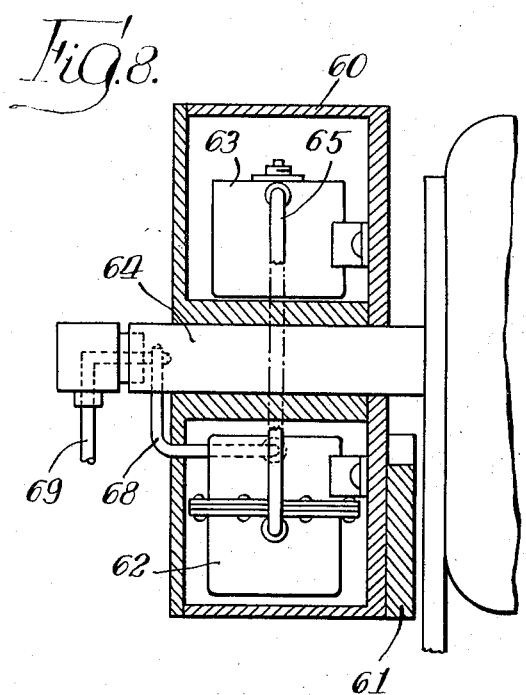
Figure 9:
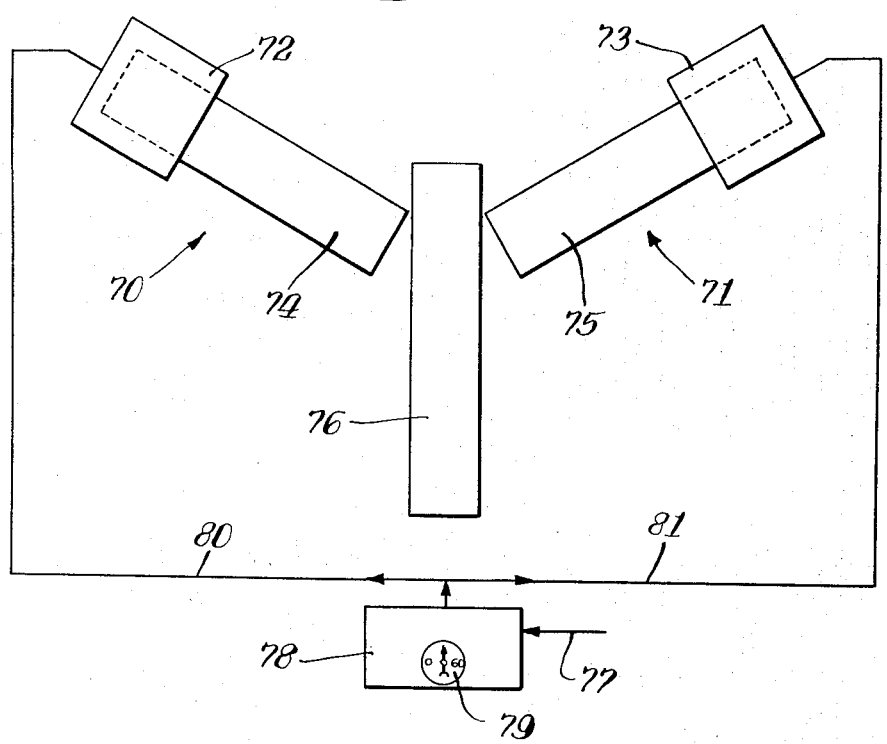

Other and further objects will become readily apparent from the following detailed description taken in connection with the accompanying drawings, in which:

FIG. 1 is a side elevational view of a vibratory feeder embodying the apparatus of the present invention;
FIG. 2 is a sectional view taken along line 2—2 of FIG. 1;
FIG. 3 is an enlarged side elevational view of a counterweight wheel of the present invention;
FIG. 4 is a horizontal section taken along line 4—4 of FIG. 3;
FIG. 5 is a view like FIG. 3 of a modified form of counterweight wheel;
FIG. 6 is a horizontal section taken along line 6—6 of FIG. 5;
FIG. 7 is a view like FIG. 3 of a modified form of construction;
FIG. 8 is a view like FIG. 4, but of the modified form of construction shown in FIG. 7; and
FIG. 9 is a plan view showing an arrangement of two feeders and common central conveyor.

While this invention is susceptible of embodiment in many different forms, there is shown in the drawings and will herein be described in detail several embodiments, with the understanding that the present disclosure is to be considered as an exemplification of the principles of the invention and is not intended to limit the invention to the embodiments illustrated. The scope of the invention will be pointed out in the appended claims.

Referring now to the drawings, there is shown a vibratory apparatus 10 generally of the type illustrated in the Musschoot et al. Patent 3,089,582. As more particularly described therein the apparatus includes a trough or work member 11 adapted to carry the material to be fed. Normally a hopper (not shown) is located above the trough so as to maintain a constant level of material therein and the trough is vibrated generally along the line of the dotted arrow to produce movement of the material from left to right as seen in FIG. 1, which would normally be from a hopper on the left to a place of utilization on the right.

The work member is supported on isolation springs 12 in turn supported on a base 13. An exciter member 14 is carried by the trough and includes a constant speed electric motor 15 supported by brackets 16 upon a transverse hollow tube 17. Rubber shear springs 18 at each end of the hollow tube serve as springs interconnecting the exciter member to the work member. For this purpose a bolt 19 extends from end to end through the tubular member 17 and is connected to the frame plates 20 as shown. The plates 20 in turn are connected to the underside of the trough. The apparatus thus far described is similar to that illustrated in the aforementioned Musschoot et al. patent.

Attached to the motor shafts 15a and 15b are a pair of counterweight members 21, each comprising a wheel-like member 22 to which is secured a fixed counterweight 23. It will be noted that the counterweight 23 is eccentric to the axis of rotation of the wheel 22. Also fixed to the wheel 22 is a first reservoir 24 and a second reservoir 25 radially inwardly spaced from the reservoir 24, i.e., the reservoir 25 is closer to the axis of rotation of the wheel 22 than is the reservoir 24. The reservoirs are interconnected by a fluid conduit 26. The reservoir 24 is divided into a fluid chamber 27 and an air chamber 28 by means of a "Bellofram" type diaphragm unit 29. Means in the form of an air line 30 and air connection 31 permit air under pressure to be introduced into or withdrawn from the air chamber 28 to move the bellows of the diaphragm unit radially outwardly within the reservoir 24. With the fluid chamber of the reservoir 24 filled with fluid as shown in FIG. 3, application of air pressure to the diaphragm unit by means of the introduction of such air into the air chamber 28 forces fluid through the conduit 26 and into the reservoir 25.

In operation, with the counterweight wheel 22 rotating and in the absence of air pressure in the air chamber centrifugal force causes the fluid to move into the fluid chamber 27 of the reservoir 24. Preferably, the fluid is relatively heavy, such as mercury or the like. As the reservoir 24 is on the opposite side of the axis of rotation from the fixed counterweight 23, it tends to counterbalance the fixed weight 23 and hence reduce the effective weight eccentricity of the counterweight member. Upon the application of air under pressure to the air chamber 28, the diaphragm unit is moved radially outwardly to force some of the fluid into the conduit 26 and hence into the reservoir 25. Thus, some of the counterbalancing weight is removed from the reservoir 24 and added to the reservoir 25 which acts in parallel with the fixed counterweight, thereby increasing the effective weight eccentricity. The amount of liquid moved from the reservoir 24 to the reservoir 25 will depend upon the amount of air pressure introduced into the diaphragm unit. Thus, the effective eccentricity of the weight mass can be varied while the apparatus is in operation. As previously stated, the degree of eccentricity of the off-axis mass of the counterweight member determines the force developed with rotation of the constant speed motor. As the amplitude of movement of the work member is determined in part by the force generated by the exciter, a means has been provided for effectively controlling such amplitude and hence the rate of feed of material carried on the work member.

A somewhat modified form of the invention is shown in FIGS. 5 and 6. There is there illustrated a modified counterweight member 41 comprising a wheel 42 provided with a fixed counterweight 43. Mounted on the wheel is an arcuate or curved cylinder 44 in which a piston 45 is reciprocable. The cylinder is closed at one end by a closure member 46 through which an air line 47 passes. The air line 47 is connected to an air conduit 48 for supplying air thereto under pressure during operation of the motor. An arcuate channel 49 is provided on the wheel 42 with the channel having a first portion adjacent the periphery of the wheel and a second portion located closer to the axis of rotation of the counterweight wheel. A weight 50 is mounted on wheels 51 for movement along the track with the movement being effected by means of a curved connecting rod 52 having one end pivotally connected at 53 to the weight with its other end being connected to the piston 45.

As with the previous embodiment, when the motor shaft 54 is rotated by the constant speed motor, centrifugal force biases the weights along the channel 49 to the position shown in solid lines in FIG. 5. Introduction of air under pressure into the cylinder 44 behind the piston 45 moves the latter in the cylinder to cause the connecting rod to push the weights toward the dotted line position shown in FIG. 5. Again as in the previous embodiment, the amount of movement of the weight along its arcuate channel is directly proportional to the amount of air pressure supplied to the cylinder and thus the weight may be maintained in any position intermediate the ends of the channel. Obviously, in one position (the solid line position of FIG. 5), the weight 50 tends to counterbalance the fixed eccentric weight 43, while in the dotted line position it adds its weight to that of the eccentric weight. In intermediate position the effect is in the same direction but of lesser degree.

If desired, the path or channel in which the weight is movable may be made as a section of a circle concentric with the axis of rotation and spring or other resilient means provided to bias the weight toward one of its two extreme positions of movement, with the piston and cylinder device being utilized to move it toward the other position. In other words, the biasing means rather than centrifugal force would be utilized to oppose the action of the piston and cylinder device.

Referring to the embodiment shown in FIGS. 7-9, the arrangement is quite similar to that previously described with the exception that the fixed counterweight, rather than being positioned on the opposite side of the axis of rotation from the reservoir most remote from such axis, is positioned on the same side of that axis as the most remote reservoir. As shown in FIGS. 7 and 8, there is a wheel 60 to which is secured a fixed counterweight 61. Within the wheel 60 is positioned a first reservoir 62 and a second opposed reservoir 63, both radially spaced from the axis of rotation of the wheel about the shaft 64 as shown. Interconnecting the two reservoirs is a conduit 65 so that fluid 66 within the reservoir 62 may flow to and into the reservoir 63. Fluid may be forced from reservoir 62 to the reservoir 63 by introducing air under pressure into the space 67 above a diaphragm 68, the air being introduced by means of an air connection 69.

In operation, with no air pressure applied to the space 67, the fluid will flow into the reservoir 62 as the wheel 60 is rotated. As the weight of the fluid is then additive to the effect of the fixed counterweight 61, maximum vibration occurs. As air is introduced into the space 67 fluid in the reservoir 62 is forced into the reservoir 63, thus reducing the amount of vibration. When all of the fluid has been moved into the reservoir 63 the system can be arranged so that the wheel is balanced and thus runs smoothly, creating no vibrations. When the air pressure is reduced, centrifugal forces tend to move all fluid toward the outermost reservoir 62.

Unique advantages flow from combining two feeders to feed into a single system with one of the feeders being arranged as the device of FIGS. 1-4, while the other feeder is provided with the wheel of FIGS. 7-8. Such an arrangement is shown in FIG. 9 where there is provided a pair of feeders 70 and 71, with the feeder 70 having the counterweight system of FIGS. 3 and 4 and the feeder 71 having the counterweight arrangement of FIGS. 7 and 8. Positioned above each feeder is a trough 72-73 for feeding material into the respective troughs 74-75. The troughs empty onto a single conveyor 76.

Air from a source under pressure is introduced through line 77 into a control mechanism 78 which by means of a regulator 79 can proportion the air exiting from the control mechanism 78 into lines 80 and 81 leading respectively to air inlet lines comparable to the lines 30 and 69.

With air pressure in lines 80 and 81 at zero p.s.i. feeder 70 would, in effect, be feeding zero material as the weight of the fluid 27 is counterbalanced by the fixed counterweight 23 while at the same time feeder 71 would be feeding at maximum feed as the weight of the fluid 66 is added to the weight of the fixed counterweight 61 to produce maximum feed. As air under pressure is introduced into the lines 80 and 81 by operation of the regulator 79, some of the fluid in the reservoir 24 is displaced creating an imbalanced condition which would cause feeder 71 to vibrate and hence to begin to feed, while at the same time the amount of vibration occurring in feeder 71 would be lessened because some of the fluid would be moved by the air pressure into the reservoir 63. As air pressure is increased, the rate of feed of feeder 70 would increase while that of feeder 71 would decrease.

Thus, it can be seen that combining the counterweight systems of FIGS. 3 and 7 into two different feeders, feeding to a common destination, a proportioning system can be evolved to proportion the feed from each of the feeders. Thus, it can be arranged that the feed rate is at 100% at all air pressure conditions. At zero air pressure, 100% of the feed is from feeder 71, while at maximum air pressure (about 60 p.s.i.) 100% of the feed is from feeder 70. At all intermediate pressures the feed is divided between the two feeders. Thus, if feeder 70 is feeding one ingredient and feeder 71 another, the mixture of the two, i.e., the proportions of the two ingredients can easily be varied by a single control while maintaining the same total rate of feed of the material.

We claim:

1. In a vibratory apparatus having a work member supported on isolation springs and an exciter member connected to the work member by a spring system for imparting a vibratory force to the work member, means for varying the magnitude of the vibratory force comprising, a motor on the exciter member, a counterweight member connected to the motor to be rotated thereby, a first fluid reservoir on the counterweight member on one side of the axis of rotation thereof, a second fluid reservoir on the counterweight member on the other side of said axis, the second reservoir being closer to said axis than the first reservoir, a fluid conduit interconnecting the reservoirs, the positions of the reservoirs relative to the axis biasing the fluid in the second reservoir to flow through said conduit to the first reservoir upon rotation of the counterweight member, and pressure producing means to move fluid from the first reservoir against said bias.

2. The vibratory apparatus of claim 1 including a fixed weight on the counterweight member adjacent one of said reservoirs.

3. The vibratory apparatus of claim 2 in which said one reservoir is the second reservoir.

4. In a vibratory apparatus having a work member supported on isolation springs and an exciter member connected to the work member by a spring system for imparting a vibratory force to the work member, means for varying the magnitude of the vibratory force comprising, a constant speed motor on the exciter member, a wheel-like counterweight member secured to the shaft of the motor to be rotated thereby, a fixed eccentric weight on the counterweight member, a second eccentric weight on the counterweight member movable from a first position adjacent the fixed weight to a second position on the opposite side of the axis of rotation of the counterweight member from said fixed weight, and means for moving the movable weight during operation of the motor to shift the movable weight between the first and second positions.

5. In a vibratory apparatus having a work member supported on isolation springs and an exciter member connected to the work member by a spring system for imparting a vibratory force to the work member, means for varying the magnitude of the vibratory force comprising, a constant speed motor on the exciter member, a wheel-like counterweight member secured to the shaft of the motor to be rotated thereby, means on the counterweight member defining an arcuate path having a first portion remote from the axis of rotation of the counterweight member and a second portion closer to said axis, a weight movable along said path and means for moving the weight along said path during rotation of the counterweight member whereby to vary the eccentricity of said weight relative to said axis.

6. The vibratory apparatus of claim 5 wherein said means for moving the weight comprises an arcuate cylinder, a piston reciprocable in said cylinder, means connecting the piston to the weight, and means for introducing air under pressure into said cylinder to move the weight along said path.

7. In a vibratory apparatus having a work member supported on isolation springs and an exciter member connected to the work member by a spring system for imparting a vibratory force to the work member, means for varying the magnitude of the vibratory force comprising, a motor on the exciter member, a counterweight member connected to the motor to be rotated thereby, a first fluid reservoir on the counterweight member on one side of the axis of rotation thereof, a second fluid reservoir on the counterweight member on the other side of said axis, the second reservoir being closer to said axis than the first reservoir, a fluid conduit interconnecting the reservoirs, the positions of the reservoirs relative to the axis biasing the fluid in the second reservoir to flow through said conduit to the first reservoir upon rotation of the counterweight member, a diaphragm in the first reservoir dividing the same into a fluid chamber and an air chamber, and means means for introducing air under pressure into said air chamber to move the diaphragm thereby to force fluid from the first reservoir into the second reservoir against said bias.

8. A rotatable counterweight having a variable eccentricity comprising, a counterweight member adapted to be mounted for rotation about an axis, a first fluid reservoir on the counterweight member on one side of the axis of rotation thereof, a second fluid reservoir on the counterweight member on the other side of said axis, the second reservoir being closer to said axis than the first reservoir, a fluid conduit interconnecting the reservoirs, the positions of the reservoirs relative to the axis biasing the fluid in the second reservoir to flow through said conduit to the first reservoir upon rotation of the counterweight member, and pressure producing means to move fluid from the first reservoir against said bias.

9. An adjustable counterweight system comprising a rotatably mounted counterweight member, a pair of fluid-containing reservoirs mounted in opposed relation on the counterweight member at unequal distances from the axis of rotation of the counterweight member, a fluid conduit interconnecting the reservoirs, rotation of the counterweight member biasing fluid in the reservoirs through said conduit into one of the reservoirs, and means for forcing the fluid through said conduit while the counterweight member is rotating to move fluid from said one reservoir into the other reservoir.

10. A rotatable counterweight having a variable eccentricity comprising, a counterweight member adapted to be mounted for rotation about an axis, means on the counterweight member defining an arcuate path having a first portion remote from the axis of rotation of the counterweight and a second portion closer to said axis, a weight movable along said path, a motor, and means connecting the motor to the weight for moving the weight along said path during rotation of the counterweight member whereby to vary the eccentricity of said weight relative to the axis.

11. In a vibratory apparatus having a work member supported on isolation springs and an exciter member connected to the work member by a spring system for imparting a vibratory force to the work member, means for varying the magnitude of the vibratory force comprising, eccentric weight means mounted for rotation about an axis and carried by the exciter to generate a vibratory force, said eccentric weight means being movable from a first position relative to the axis of rotation to a second position closer to said axis, and motor means connected to move said eccentric weight means from said first position to said second position for varying the eccentricity of said weight means during operation of the apparatus.

12. In a vibratory apparatus having a work member supported on isolation springs and an exciter member connected to the work member by a spring system for imparting a vibratory force to the work member, means for varying the magnitude of the vibratory force comprising, a motor on the exciter member, a counterweight member connected to the motor to be rotated thereby to generate a vibratory force, eccentric weight means mounted on the counterweight member and movable from a first position remote from the axis of rotation of the counterweight member to a second position closer to said axis, and a second motor connected to said eccentric weight means for moving the same from said first position to said second position during rotation of the counterweight member.

13. A proportioning apparatus comprising a pair of vibratory devices arranged to feed into a common receiver, each of said vibratory devices having a work member supported on isolation springs and an exciter member connected thereto by a spring system for imparting a vibratory force to the work members each of said exciters comprising a constant speed motor, a wheel-like counterweight member connected to the motor to be rotated thereby, a first fluid reservoir on each counterweight member on one side of the axis of rotation thereof, a second fluid reservoir on the counterweight member on the other side of said axis, each of said second reservoirs being closer to said axis than the first reservoirs, a fluid conduit interconnecting each first reservoir with each second reservoir, the positions of the reservoirs relative to the axis of rotation of the counterweight member biasing the fluid in the second reservoirs to flow through said conduit to said first reservoirs upon rotation of the counterweight members, means for introducing air under pressure into each of said first reservoirs to force fluid therefrom into the second reservoirs, a fixed counterweight on each of said counterweight members with the fixed counterweight one one of said vibratory devices being located on the counterweight member to counterbalance fluid in the first reservoir of said counterweight member and with the fixed counterweight on the other of said vibratory devices being located on the counterweight member so as to act additively to the fluid in the first reservoir, a common source of air under pressure connected to each of said first reservoirs, and control means for regulating said pressure.

14. A proportioning system comprising a first vibratory feeder and a second vibratory feeder, spring means supporting said feeders for vibratory movement, counterweight means movably mounted on the first vibratory feeder for rotation about an axis, means including fluid under pressure for moving said counterweight means in a direction away from said axis to increase the amplitude of vibration of said first vibratory feeder, counterweight means movably mounted on the second vibratory feeder for rotation about an axis, means including fluid under pressure for moving said counterweight means in a direction toward said axis to decrease the amplitude of vibration of the second vibratory feeder, a common source of air under pressure connected to the counterweight moving means on each feeder, and means for controlling the pressure of said air whereby to proportion the rate of feed of each of said feeders.

15. A proportioning system comprising a first vibratory feeder and a second vibratory feeder, spring means supporting said feeders for vibratory movement, pneumatically operated means on the first vibratory feeder for increasing the amplitude of vibration of said first vibratory feeder, pneumatically operated means on the second vibratory feeder for decreasing the amplitude of vibration of said second vibratory feeder, a common source of air under pressure connected to the pneumatically operated means on each feeder, and means for controlling the pressure of said air whereby to proportion the rate of feed of each of said feeders.

16. In a vibratory apparatus having a work member supported on isolation springs and an exciter member connected to the work member for imparting a vibratory force to the work member, means for varying the magnitude of the vibratory force comprising, a constant speed motor on the exciter member, a wheel-like counterweight member secured to the shaft of the motor to be rotated thereby, a fixed eccentric weight on the counterweight member, a second eccenric weight on the counterweight member movable from a first position adjacent the fixed weight to a second position on the opposite side of the axis of rotation of the counterweight member from said fixed weight, and means for moving the movable weight during operation of the motor to shift the movable weight between the first and second positions.

References Cited
UNITED STATES PATENTS

| | | | |
|---|---|---|---|
| 1,896,712 | 2/1933 | Linke | 74—61 |
| 3,122,930 | 3/1964 | Allen | 74—61 |

RICHARD E. AEGERTER, *Primary Examiner.*